United States Patent
Namura et al.

[11] Patent Number: 5,603,999
[45] Date of Patent: *Feb. 18, 1997

[54] TETRAFLUOROETHYLENE/FLUORO-ALKOXY TRIFLUOROETHYLENE COPOLYMER COMPOSITION

[75] Inventors: Shinichi Namura; Takao Nishio, both of Shimizu, Japan

[73] Assignee: Du Pont - Mitsui Fluorochemicals, Tokyo, Japan

[*] Notice: The term of this patent shall not extend beyond the expiration date of Pat. No. 5,473,018.

[21] Appl. No.: 531,683

[22] Filed: Sep. 21, 1995

Related U.S. Application Data

[62] Division of Ser. No. 264,122, Jun. 22, 1994, Pat. No. 5,473,018.

[30] Foreign Application Priority Data

Jun. 30, 1993 [JP] Japan ................................ 5-183485
Mar. 28, 1994 [JP] Japan ................................ 6-079215

[51] Int. Cl.$^6$ .......................... B29D 23/22; B29D 22/00; B65D 1/02; C08L 27/18
[52] U.S. Cl. .................. 428/36.92; 428/35.7; 428/36.9; 525/200
[58] Field of Search ................. 428/35.7, 36.9, 428/36.92; 525/200

[56] References Cited

U.S. PATENT DOCUMENTS

| | | | |
|---|---|---|---|
| 3,132,123 | 5/1964 | Harris et al. | 260/87.5 |
| 3,484,503 | 12/1969 | Magner et al. | 525/200 |
| 4,252,859 | 2/1981 | Concannon et al. | 525/200 |
| 4,624,990 | 11/1986 | Lunk et al. | 525/199 |
| 4,914,158 | 4/1990 | Yoshimura et al. | 525/200 |
| 5,132,368 | 7/1992 | Chapman et al. | 525/200 |
| 5,208,293 | 5/1993 | Oki et al. | 525/200 |
| 5,317,061 | 5/1994 | Chu et al. | 525/200 |

*Primary Examiner*—Carman J. Seccuro, Jr.

[57] ABSTRACT

A tetrafluoroethylene/fluoroalkoxy trifluoroethylene copolymer (PFA) composition which has finer spherulite diameters compared to a conventional PFA is provided, so as to give fabricated articles having excellent surface smoothness, and which are free from problems, such as process contamination and the like, caused by leaching. This effect is obtained by incorporating into the composition prior to fabrication a polytetrafluoroethylene having a crystallization temperature of at least 305° C. and a heat of crystallization of at least 50 J/g.

3 Claims, No Drawings

TETRAFLUOROETHYLENE/FLUOROALKOXY TRIFLUOROETHYLENE COPOLYMER COMPOSITION

This is a division of application Ser. No. 08/264,122, filed Jun. 22, 1994 now U.S. Pat. No. 5,473,018.

FIELD OF THE INVENTION

The present invention relates to a tetrafluoroethylene/fluoroalkoxy trifluoroethylene copolymer composition which gives a melt extruded product having excellent surface smoothness.

BACKGROUND OF THE INVENTION

Melt formable tetrafluoroethylene/fluoroalkoxy trifluoroethylene copolymers (known by the acronym PFA) have excellent characteristics in heat resistance, chemical resistance, and the like, and are used to obtain bottles and tubes by melt extrusion, which find use in containers for high-purity chemicals used in semiconductor manufacture or tubing for transporting liquid chemicals or ultra-pure water.

The problem has arisen in semiconductor-related applications, that articles extruded from PFA do not have smooth surfaces, so that contaminants in the liquid chemicals used in these applications tend to adhere to the surface, and are difficult to remove even upon rinsing.

The reason the surfaces of the PFA-extruded products are not smooth is that coarse spherulites, reaching diameters of 20–150 micrometer (μm), are generated during the crystallization of PFA, with their spherulite border regions generating deep grooves on the surface of the molded products. It is generally known that the size of a spherulite can be made smaller by increasing the number of spherulite nuclei. A variety of inorganic or organic crystallization nucleating agents have been added to crystalline resins for this purpose. Nucleating agents for rendering finer spherulites in fluororesins have also been proposed, which include metal sulfate salts for polychlorotrifluoroethylene (Japanese Patent Application Publication Kokai 49-5153) and alkali metal salts for polyvinylidene fluoride (Japanese Patent Application Publication 49-17015) However, in semiconductor manufacturing process-related applications which require particularly high purity liquid chemicals or ultra-pure water, metal salt nucleating agents will leach out, causing contamination in the process steps and adversely affecting PFA's chemical resistance and minimal contamination advantages.

SUMMARY OF THE INVENTION

Study by the present inventors has led to the finding that incorporating in a PFA a small amount of a specific polytetrafluoroethylene (PTFE) can render the spherulites finer to substantially improve the surface smoothness of the extruded products without adversely affecting the characteristics of the PFA, and without causing any contamination problem due to leaching. The melt formable tetrafluoroethylene/fluoroalkoxy trifluoroethylene copolymer composition of this invention is characterized by containing a polytetrafluoroethylene having a crystallization temperature of at least 305° C. and a heat of crystallization of at least 50 J/g.

DETAILED DESCRIPTION OF THE INVENTION

The composition of this invention generates fine spherulites, thereby giving melt extruded articles such as bottles and tubes which have far superior surface smoothness compared to molded articles from conventional PFA. Consequently, the extent of adhering contaminants is reduced. Finer spherulites result in superior visual image resolution when one looks through these molded articles. The PTFE used as an additive has heat resistance and chemical resistance properties as good as those of PFA, so that there is no problem of contaminating semiconductor fabrication steps due to leaching. In addition, the compositions of this invention maintain melt moldability and mechanical properties equivalent to those of conventional PFA.

As will be seen in Examples and Comparative Examples given later, there is a correlation between the surface roughness of a molded product and the average spherulite diameter (hereafter "recrystallized average spherulite diameter") obtained by melting the molded article (part of the molded article being cut out to be used as the test piece), followed by cooling the melt at a cooling rate of 10° C./min for recrystallization or the maximum spherulite diameter (hereafter "recrystallized maximum spherulite diameter"), so that under the same molding conditions, the smaller the recrystallized average spherulite diameter (or the recrystallized maximum spherulite diameter), the smoother the surface of the molded article. The expressions "recrystallized average spherulite diameter" and the "recrystallized maximum spherulite diameter" are defined later herein. In general, a melt extruded product of a PFA composition which is generally available on the market having a recrystallized average spherulite diameter of 55 μm (70 μm for the recrystallized maximum spherulite diameter) has a rough surface. However, the melt molded articles obtained from the composition of this invention having a recrystallized average spherulite diameter of 3 μm (5 μm for the recrystallized maximum spherulite diameter) show little surface roughness. The molded articles obtained from the composition of this invention, which have recrystallized average spherulite diameters of not more than 15 μm, preferably not more than 10 μm, thereby provide a smooth surface.

The term tetrafluoroethylene/fluoroalkoxy trifluoroethylene copolymer (PFA) referred to in this invention means crystalline copolymers of tetrafluoroethylene and at least one fluoroalkoxy trifluoroethylene represented by Formula 1 or Formula 2, with fluoroalkoxy trifluoroethylene content in the copolymer being 1–10 wt % based on total copolymer. The copolymer is melt formable by melt extrusion, injection molding, or the like, and has a melt flow rate (MFR) of 0.5–500 g/10 min, preferably 0.5–50 g/10 min at 372° C.±1° C. The fluoroalkoxy trifluoroethylenes of formula 1 and 2 include perfluoro(methyl vinyl ether), perfluoro(propyl vinyl ether), perfluoro(isobutyl vinyl ether), and the like.

Formula 1:

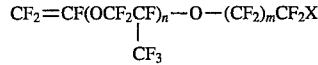

wherein X is H or F, n is an integer of 0–4 and m is an integer of 0–7.

Formula 2:

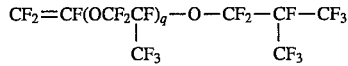

wherein q is an integer of 0–3

The polytetrafluoroethylene (PTFE) that is incorporated into the PFA in this invention is a homopolymer of tetrafluoroethylene (TFE) or a modified PTFE containing not more than 1 wt % of a modifying comonomer, such as hexafluoropropylene (HFP), fluoroalkoxy trifluoroethylene, fluoroalkyl ethylene, chlorotrifluoroethylene, or the like. The PTFE must have a crystallization temperature of at least 305° C. and a heat of crystallization of at least 50 J/g, as measured with a differential scanning calorimeter (DSC) by a method which will be described later.

There is a correlation between the crystallization temperature of the PTFE incorporated in a PFA and the effect of rendering finer spherulites: the higher the crystallization temperature, the smaller the amount needed for rendering finer spherulites. The PTFE must have a crystallization temperature of at least 305° C., preferably at least 310° C., more preferably 312° C.

A PTFE having a heat of crystallization of at least 50 J/g is required to obtain the effect of fine spherulites under conditions in which high shear of the PFA composition is involved, as by the revolution of screws when melt mixing or extruding the composition.

The crystallization temperature and heat of crystallization of PTFE are known to depend upon two factors: the modifier content and the molecular weight. For example, standard specific gravity (SSG) is ordinarily determined as an indirect measure of molecular weight for high molecular weight PTFE, SSG being a parameter that increases with decreasing molecular weight. The general relationship between SSG and number average molecular weight is well known. See, for example, Sperati & Starkweather, Fortschr. Hochpolym.-Forsch. 2, 465(1961). Higher specific gravity corresponds to higher crystallinity which is accompanied, of course, by higher heat of crystallization. On the other hand, if molecular weight is too low or modifier content is too high, then crystallization temperature is reduced below 305° C. In contrast to a PTFE "molding powder" which is molded by compression premolding/sintering, or a PTFE "fine powder", molded by paste extrusion/sintering, all of which have number average molecular weights of several million or higher and heats of crystallization typically of 20–35 J/g and crystallization temperatures typically of 305° C.–315° C., the PTFE which is suitable for the objective of this invention has a lower molecular weight and a higher crystallinity. This type of PTFE can be obtained by selecting conditions with consideration of the above two factors in the known manufacturing processes for low molecular weight PTFE's, such as the polymerization of TFE in the presence of a chain transfer agent or the thermal decomposition or radiation degradation of a "molding powder" or a "fine powder" or a molded article therefore. Such PTFE is low in molecular weight and highly crystalline, and consequently has high heat of crystallization. Thus, it lacks mechanical strength and cannot be used by itself for molding, unlike "molding powder" or "fine powder". However, low molecular weight PTFE was found to have no adverse effect on the mechanical properties of a PFA when used in small amounts for achieving the surface smoothening objective of this invention. Low molecular weight PTFE prepared by subjecting higher molecular weight PTFE to ionizing radiation is a preferred PTFE for use in the compositions of this invention.

Incorporating a PTFE which satisfies the above conditions in a PFA will rapidly decrease the recrystallized average spherulite diameter. With respect to the lower limit for the content, it is difficult to give a numerical limitation because a smaller content can still give a fine spherulite if the PTFE which is incorporated has a higher crystallization temperature, but the preferred content is the effective amount which is able to provide a recrystallized average spherulite diameter for the PFA composition of not more than 15 μm, preferably not more than 10 μm, when the composition is allowed to crystallize from the melt at a cooling rate of 10° C./min. As will be described later in Table 4, incorporating 0.01 wt % of a PTFE having a crystallization temperature, Tc, of 314° C. and a heat of crystallization, Hc, of 60 J/g gives a recrystallized average spherulite diameter of 13 μm, so that the measure for the lower limit of the PTFE content would be about 0.01 wt %.

In order to improve the surface smoothness of the molded articles, the recrystallized average spherulite diameter is preferably made as small as possible. In general, increasing the PTFE content tends to decrease the recrystallized average spherulite diameter, but as the content reaches 1–2 wt % or more, the further extent of reduction in the recrystallized average spherulite diameter with an increase in the content becomes smaller; as the PTFE content exceeds about 20 wt %, the recrystallized average spherulite diameter begins to plateau, resulting in the surface smoothness also becoming constant, so that the upper limit for the amount of PTFE added is not definitive. With an increase in the PTFE content, the composition tends to be higher in crystallinity, without any adverse affect to the mechanical properties, such as tensile strength or folding endurance, etc., as long as the PTFE content is 2–4 wt % or less, although this depends upon the MFR values of PFA's. However, incorporation beyond these levels begins to gradually decrease the physical properties, so that levels exceeding about 50 wt % of PTFE will drastically decrease the mechanical properties; therefore, the upper limit of addition of the PTFE is preferably 50 wt % or less, more preferably 30 wt % or less, and even more preferably, 4 wt % or less. PTFE content is based on combined weight of PTFE and PFA in the composition.

The methods used for adding and blending PTFE with PFA in this invention include any method known in the art, such as melt blending, dry blending PFA pellets or powder with a PTFE powder, wet blending a PFA liquid dispersion with a PTFE powder or PTFE liquid dispersion, or the like. It is also possible to use a method by which PTFE particles are dispersed in a polymerization medium of the polymerization kettle for PFA in a preliminary step, followed by initiating the polymerization of PFA, thereby generating a PFA composition containing PTFE. Since the PTFE used in this invention is extremely compatible with the PFA in the melted state, it is easily dispersed in the PFA during melt blending or melt extrusion, thereby providing an extremely homogeneous composition. That is, the PTFE particles are no longer distinguishable from the PFA matrix when a sample prepared as for measurement of spherulite diameter is examined under an optical microscope at 100× magnification, or by DSC analysis. Therefore, there is no particular limitation as to the configuration of the PTFE being added, normally in terms of workability, a dispersion of fine particles with average particle sizes of 0.05–1 μm or several μm to several tens of μm is used.

EXAMPLES

The present invention is specifically described by the following Examples and Comparative Examples. A tetrafluoroethylene/perfluoro(propyl vinyl ether) (PPVE) copolymer was used as the tetrafluoroethylene/fluoroalkoxy trifluoroethylene copolymer (PFA), for which the following methods were used to measure the PPVE content, melt flow rate (MFR), melt temperature, crystallization temperature, heat of crystallization, maximum spherulite diameter, tensile strength, elongation, and MIT folding endurance.

PPVE Content: A PFA sample was compressed at 350° C. and water cooled to give a 50 μm thick film, which was used to measure the infrared absorption spectrum (in a nitrogen atmosphere) from which an absorbance ratio was obtained according to Equation 3. The sample PPVE content was determined by comparing the ratio with a calibration curve obtained preliminarily with standard films containing known PPVE contents.

$$\text{Absorbance Ratio} = \frac{\text{Absorbance (at a wavelength of 10.07 } \mu\text{m)}}{\text{Absorbance (at a wavelength of 4.25 } \mu\text{m)}}$$

Melt Flow Rate (MFR): This was measured on a Toyo Seiki Company Melt Indexer by holding a 5 g sample in an 9.53 mm inside diameter cylinder at 372° C.±1° C. for 5 minutes and then extruding it under a 5 kg weight (piston and weight) through an orifice 2.1 mm in diameter and 8 mm long, thereby measuring the rate of extrusion (g/10 min) which was reported as MFR.

Melt Temperature, Crystallization Temperature, and Heat of Crystallization: A Perkin Elmer differential scanning calorimeter DSC Model 7 was used. A 5 mg sample was weighed in a dedicated aluminum pan, crimped by a crimper, placed in the DSC proper, and heating was started. The heating was at a rate of 10° C./min from 200° C. to 380° C. The melt peak temperature was read from a melting curve as melt temperature Tm-1. After the sample was held for one minute at 380° C. the sample was cooled at a rate of 10° C./min to 200° C. to obtain a crystallization curve, from which a crystallization peak temperature was obtained as the temperature of crystallization (Tc). The heat of crystallization (Hc) was obtained according to the usual procedure from the peak area defined by connecting with a straight line the point at which the curve departs from the baseline near the crystallization peak and the point at which the curve returns back to the baseline. After the sample was held for one minute at 200° C., the sample was then heated again to 380° C. at a rate of 10° C./min to give a melt curve from which the melt peak temperature was taken as melt temperature Tm-2. Each numerical value was obtained to one decimal point and was rounded by the method of JIS Z8401.

Recrystallized Average Spherulite Diameter: Melt indexer extrudate from MFR measurement was sliced in a radial direction to give a disc about 0.2 mm thick as a sample. The disc was placed on a slide glass and the slide glass was mounted on a Metier FP82HT model hot stage. The sample was melted by heating at a rate of 40° C./min to 360° C., followed by holding for 3 minutes at 360° C. and then cooling to 200° C. at a rate of 10° C./min for recrystallization. After reaching the sample temperature of 200° C., the slide glass holding the sample was removed from the hot stage and the sample surface was observed with an optical microscope at magnifications of 100× and 400×. The spherulite structure was confirmed by polarized light. Diameters of 200 contiguous spherulites observed on the sample surface were measured to obtain an average value which was defined as "the recrystallized average spherulite diameter". The maximum diameter for contiguous spherulites was defined as "the recrystallized maximum spherulite diameter". Since spherulites were observed as polyhedra distorted by collision with adjacent spherulites, their major axes were reported as their diameters. Spherulite diameters were also measured with a scanning electron microscope (at magnifications of 3000× and 5000×) for samples having recrystallized average spherulite diameters of 5 μm or less.

Tensile Strength and Elongation: The sample was filled into a mold which had been heated to 350° C. on a hot press, heated 20 minutes, pressed about 1 minute under a pressure of about 5 kgf/cm², followed by moving the mold to a press at room temperature and pressing under a pressure of about 30 kgf/cm², and allowing it to cool for 20 minutes. The resultant sheet was about 1.5 mm thick and was cut out to give about five test pieces according to ASTM D1457-83 so as to carry out a tensile test with an initial grip distance of 22.2 mm at a separation rate of 50 mm/min to measure the strength at the break and elongation at the break (the average values from five test pieces).

MIT Folding Endurance: The sample was heated for 15 minutes in a mold heated to 350° C. on a hot press and pressed for about 1–4 minutes at a pressure of 30–60 kgf/cm², the pressure being different depending upon the MFR of the PFA, followed by moving the mold to a press at room temperature to be pressed at about 50 kgf/cm², followed by standing for 15 minutes and cooling. The resultant 0.19–0.21 mm thick film was cut out to give test pieces about 110 mm long and 15 mm wide; the test pieces therefrom were mounted on a Toyo Seiki K.K. MIT Folding Endurance Machine according to the specification of ASTM-2176 so as to fold under a load of 1 kg from left and right to an angle of 135° at a rate of 175 cycles/minute. The number of oscillating folds made until the test pieces ruptured (the average from three test pieces) was defined as the MIT folding endurance.

Examples 1–6 and Control Examples 1–3

Ninety-nine parts by weight of PFA melt extruded pellets having a PPVE content of 3.0 wt %, an MFR of 2.0 g/10 min, a recrystallized average spherulite diameter of 44 microns, and a recrystallized maximum spherulite diameter of 68 microns, and 1 part by weight of a PTFE powder (average particle size of 2–20 μm) from eight types A-H having the properties shown in Table 1 were fed into a roller mixer (Toyo Seiki K.K., R-60 Model; mixer volume about 60 cm³; material of construction for the mixing pan: Hastelloy® C-276) so as to melt mix for 10 minutes at a mixing section set temperature of 350° C., a resin temperature of 345°–352° C. and the rate of roller revolutions at 15 rpm to give a PFA composition containing 1 wt % PTFE. PTFE types B, E and F are commercially available powders, respectively, TLP 10F-1 (Mitsui DuPont Fluorochemicals), MP-1200 (DuPont), and L-5 (Daikin). PTFE types A, C, D and G were prepared from various PTFE "molding powder" and "fine powder" by gamma irradiation with doses in the range 1–20 Mrad. PTFE type H was prepared by thermal degradation of a melt formable copolymer. PTFE types A and H did not satisfy the heat of crystallization or crystallization temperature requirement of this invention. For the purpose of comparison, the above-described PFA alone with no PTFE was also melt mixed under the same conditions (Control Example 1). Each composition was then cut into 3–5 μm square pellets after melt mixing to obtain samples for molding. Table 2 shows the properties of each of these compositions and test pieces molded from these compositions.

TABLE 1

| | PTFE Types Used | | | | | | | |
|---|---|---|---|---|---|---|---|---|
| | A | B | C | D | E | F | G | H |
| Modifier Type | None | HFP | HFP | None | HFP | NOne | PPVE | PPVE |
| Content (wt %) | | 0.1 | 0.05 | | 0.1 | | 0.1 | 1.2 |
| DSC Analysis of PTFE: | | | | | | | | |
| Tm-1 (°C.) | 332 | 330 | 329 | 332 | 322 | 326 | 331 | 320 |
| Tm-2 (°C.) | 327 | 327 | 329 | 328 | 324 | 328 | 328 | 320 |
| Tc (°C.) | 314 | 315 | 312 | 316 | 312 | 308 | 313 | 302 |
| Hc (J/g) | 43 | 60 | 61 | 58 | 59 | 67 | 53 | 57 |

TABLE 2

| | Results for Examples 1–6 and Controls 1–3 | | | | | | | | |
|---|---|---|---|---|---|---|---|---|---|
| | Control Examples | | | Examples | | | | | |
| Nos. | 1 | 2 | 3 | 1 | 2 | 3 | 4 | 5 | 6 |
| PTFE Type | — | A | H | B | C | D | E | F | G |
| PTFE (wt %) | 0 | 1 | 1 | 1 | 1 | 1 | 1 | 1 | 1 |
| Composition: | | | | | | | | | |
| MFR (g/10 min) | 1.9 | 1.8 | 2.0 | 1.9 | 2.0 | 1.9 | 1.9 | 1.9 | 1.9 |
| Tm-2 (°C.) | 307 | 308 | 308 | 308 | 308 | 309 | 308 | 308 | 309 |
| Test Piece: | | | | | | | | | |
| RASD[a] (μm) | 29 | 26 | 24 | 3 | 5 | 2 | 7 | 12 | 4 |
| RMSD[b] (μm) | 45 | 40 | 35 | 5 | 7 | 4 | 11 | 18 | 7 |

[a]Recrystallized Average Spherulite Diameter
[b]Recrystallized Maximum Spherulite Diameter In contrast to a composition having no PTFE in PFA (Control Example 1), a composition having PTFE A with a heat of crystallization less than 50 J/g (Control Example 2), and a composition having a PTFE H with a crystallization temperature below 305° C. (Control Example 3), which all had recrystallized average spherulite diameters of the melt-formed products of 24 μm or greater (a recrystallized maximum spherulite diameter of 35 μm or greater), compositions from Examples 1–6 containing 1 wt % of PTFE B-G having a crystallization temperature of at least 305° C. (Tc) and a heat of crystallization (Hc) of at least 50 J/g, all had recrystallized average spherulite diameters of 15 μm or less and recrystallized maximum spherulite diameters of 20 μm or less in the melt-formed products. A comparison of Examples 1, 3, and 5 shows that Example 3 which contains PTFE D having the highest Tc at 316° C. had the smallest recrystallized average spherulite diameter at 2 μm, followed by Example 1 containing a PTFE B having a Tc of 314° C. and a recrystallized average spherulite diameter of 3 μm (a recrystallized maximum spherulite diameter of 5 μm); and Example 5 containing PTFE F having the lowest Tc of 308° C. had a recrystallized average spherulite diameter of 12 μm and recrystallized maximum spherelite diameter of 18 μm, the largest among the Examples of this invention.

Control Example 4

An aqueous PTFE dispersion containing PTFE with an average particle size of about 0.2 μm which on coagulation would give a fine powder with a Tm-1 of 337° C., a Tm-2 of 327° C., a Tc of 314° C., and an Hc of 34 J/g, was added to an aqueous dispersion of a PFA with an average particle size of about 0.2 μm, a PPVE content of 3.0 wt %, a Tm-2 of 309° C. so as to reach a weight ratio of PFA resin and PTFE resin of 99:1. The dispersion mixture was coagulated by stirring and adding nitric acid to destroy the emulsion followed by adding trichlorotrifluoroethane and stirring to form granules. The resultant granular powder was water washed, dried, and heat treated for 15 hours at 290° C. to obtain a powdery composition having an average particle size of about 450 μm. The composition had an MFR of 1.7 g/10 min giving a melt indexer extruded product having a recrystallized average spherulite diameter of 2 μm and a recrystallized maximum spherulite diameter of 3 μm. However, when this powder composition was fed into a roller mixer and melt mixed in a manner similar to that of Example 1, the melt mixed product had an MFR of 1.7 g/10 min and a melt indexer extrudate having a recrystallized average spherulite diameter of 33 μm and a recrystallized maximum spherulite diameter of 45 μm. Incidentally, a PFA powder obtained in a similar manner, except for not adding any PTFE had an MFR of 2.4 g/10 min and a recrystallized average spherulite diameter of 56 μm, and a recrystallized maximum spherulite diameter of 70 μm, which after melt mixing gave an MFR of 2.3 g/10 min with a melt indexer extrudate having a recrystallized average spherulite diameter of 35 μm and a recrystallized maximum spherulite diameter of 45 μm. The above results show that a PFA powder to which a PTFE from the Control Example having a heat of crystallization of 34 J/g was added gives an extrudate having the extremely small values of recrystallized average spherulite diameter of 2 μm and a recrystallized maximum spherulite diameter of 3 μm. However these results indicate that, when this composition is mixed during melting under shear force, the effect of rendering finer spherulites is lost.

Example 7

PFA melt extruded pellets of a PPVE content of 3.0 wt %, an MFR of 1.9 g/10 min, and a recrystallized average spherulite diameter of 55 μm and a recrystallized maximum spherulite diameter of 77 μm, and the PTFE powder B (Tc=314° C., Hc=60 J/g) used in Example 1, were melt mixed at the mixing ratios given in Table 3 in a manner similar to that of Example 1. Table 3 shows the properties of the resultant compositions and test pieces molded from the compositions. This example used a pressure of 60 kgf/cm$^2$ for about 4 minutes for pressing before the mold was moved to a room temperature press in the preparation of test pieces for the MIT folding endurance test.

of the recrystallized average spherulite diameter or the recrystallized maximum spherulite diameter. The Table also shows that a PTFE content of not more than 4 wt % gives no appreciable adverse effects on the tensile strength, elongation, or folding endurance tests. [0035]

Example 8

Melt extruded pellets of PFA having a PPVE content of 3.4 wt %, an MFR of 15.0 g/10 min, and a recrystallized average spherulite diameter of 49 μm and a recrystallized maximum spherulite diameter of 62 μm were melt mixed in a manner similar to that of Example 1 at the contents given in Table 4 using PTFE powder B (Table 1). Table 4 shows

TABLE 3

Effect of PTFE Concentration, Example 7

| PTFE B (wt %) | 0 | 0.1 | 0.2 | 0.5 | 1 | 2 | 3 | 4 | 5 | 10 | 20 | 50 |
|---|---|---|---|---|---|---|---|---|---|---|---|---|
| Composition: | | | | | | | | | | | | |
| MFR (g/10 min) | 1.7 | 1.7 | 1.7 | 1.7 | 1.7 | 1.7 | 1.7 | 1.7 | 1.7 | 1.5 | 1.4 | 1.2 |
| Tm-2 (°C.) | 308 | 309 | 309 | 309 | 310 | 310 | 310 | 312 | 312 | 314 | 318 | 324 |
| Tc (°C.) | 282 | 286 | 288 | 289 | 289 | 290 | 290 | 292 | 293 | 295 | 299 | 306 |
| Hc (J/g) | 23 | 23 | 23 | 22 | 23 | 24 | 23 | 25 | 25 | 26 | 28 | 33 |
| Test Pieces (Molded Article) | | | | | | | | | | | | |
| RASC$^a$ (μm) | 44 | 13 | 8 | 5 | 4 | 3 | 3 | 3 | 3 | 1 | 2 | 2 |
| RMSD$^b$ (μm) | 6 | 20 | 13 | 8 | 5 | 4 | 5 | 4 | 4 | 3 | 3 | 3 |
| Tensile Strength (kfg/cm$^2$) | 353 | 353 | 359 | 358 | 353 | 342 | 355 | 337 | 328 | 326 | 320 | 189 |
| Elongation at Break (%) | 376 | 368 | 378 | 380 | 375 | 366 | 378 | 360 | 347 | 360 | 378 | 268 |
| Folding Endurance | 9.4 | 14 | 9.3 | 14 | 12 | 13 | 13 | 12 | 8.3 | 8.0 | 5.8 | 0.11 |

$^a$Recrystallized average spherulite diameter
$^b$Recrystallized mamimum spherulite diameter Table 3 shows that a PTFE content as small as 0.1 wt % drastically reduces the recrystallized average spherulite diameter from 44 μm with no PTFE to 13 μm, and recrystallized average maximum spherulite diameters from 63 μm with no PTFE to 20 μm with PTFE; 1 wt % incorporation gives a recrystallized average spherulite diameter of 4 μm and an average maximum spherulite diameter of 5 μm; 2 wt % PTFE content gives a reduction down to a recrystallized average spherulite diameter of 3 μm and a recrystallized maximum spherulite diameter of 4 μm. However, incorporating more than 2 wt % PTFE causes little further decrease the properties of the resultant compositions and the test pieces molded from the compositions. In this Example, the molding conditions were a pressure of 30 kgf/cm$^2$ for about one minute before the mold was moved to a press at room temperature in preparing test pieces for the MIT folding endurance test.

TABLE 4

Effect of PTFE Concentration, Example 8

| PTFE B (wt %) | 0 | 0.01 | 0.1 | 0.2 | 0.5 | 1 | 2 | 3 | 5 | 10 | 20 | 50 |
|---|---|---|---|---|---|---|---|---|---|---|---|---|
| Composition: | | | | | | | | | | | | |
| MFR (g/10 min) | 14.8 | 14.8 | 14.8 | 14.8 | 14.9 | 14.9 | 14.4 | 13.9 | 13.0 | 12.0 | 9.8 | 2.3 |
| Tm-2 (°C.) | 308 | 308 | 308 | 309 | 309 | 309 | 312 | 312 | 314 | 318 | 320 | 326 |
| Tc (°C.) | 283 | 286 | 288 | 289 | 289 | 290 | 294 | 294 | 296 | 300 | 303 | 311 |
| Hc (J/g) | 25 | 25 | 25 | 26 | 29 | 29 | 28 | 31 | 30 | 30 | 32 | 36 |
| Test Pieces (Molded Article) | | | | | | | | | | | | |
| RASC$^a$ (μm) | 38 | 13 | 5 | 5 | 4 | 3 | 3 | 3 | 3 | 2 | 2 | 2 |
| RMSD$^b$ (μm) | 50 | 18 | 8 | 8 | 6 | 5 | 4 | 4 | 5 | 3 | 3 | 3 |
| Tensile Strength (kgf/cm$^2$) | 308 | 321 | 304 | 308 | 285 | 297 | 289 | 273 | 284 | 254 | 231 | 149 |
| Elongation at | 432 | 443 | 422 | 448 | 411 | 432 | 423 | 397 | 425 | 388 | 357 | 59 |
| Folding Endurance | 2.3 | 2.8 | 2.5 | 2.0 | 1.9 | 2.0 | 1.4 | 1.4 | 1.4 | 1.0 | — | — |

$^a$Recrystallized average spherulite diameter
$^b$Recrystallized maximum spherulite diameter Table 4 shows that a PTFE content at a level of only 0.01 wt % drastically decreases the recrystallized average spherulite diameter from 38 μm with no PTFE to 13 μm, and the recrystallized maximum spherulite diameter from 50 μm with no PTFE down to 18 μm; incorporating 1 wt % weight reduces the recrystallized average spherulite diameter down to 3 μm and the recrystallized maximum spherulite diameter to 5 μm; a 2 wt % PTFE incorporation reduces the recrystallized average spherulite diameter to 3 μm and the recrystallized maximum spherulite diameter to 4 μm. However, incorporating more than 2 wt % PTFE has little further effect on the spherulite diameter.

Example 9

The PFA pellets used in Example 8 and the PTFE powder E used in Example 4 were melt mixed at the mixing contents given in Table 5 in a manner similar to that of Example 1. Table 5 shows the properties of the resultant compositions and the test pieces molded from these compositions. Trends similar to those of Examples 7 and 8 are observed. In this Example, the molding press conditions were a pressure of 30 kgf/cm² for about one minute before the mold was moved to a press at room temperature in preparation of test pieces for the MIT folding endurance test.

TABLE 5

Effect of PTFE Concentration, Example 9

| PTFE B (wt %) | 0 | 0.5 | 1 | 2 | 3 | 4 | 5 |
|---|---|---|---|---|---|---|---|
| Composition: | | | | | | | |
| MFR (g/10 min) | 14.8 | 15.3 | 15.3 | 15.6 | 15.8 | 16.1 | 16.3 |
| Tm-2 (°C.) | 308 | 308 | 308 | 309 | 310 | 310 | 310 |
| Tc (°C.) | 283 | 287 | 288 | 289 | 289 | 290 | 291 |
| Hc (J/g) | 25 | 25 | 25 | 25 | 25 | 26 | 26 |
| Test Pieces (molded article): | | | | | | | |
| RASCᵃ (μm) | 38 | 7 | 6 | 5 | 5 | 4 | 4 |
| RMSDᵇ (μm) | 50 | 10 | 8 | 8 | 7 | 5 | 5 |
| Folding Endurance (10⁴ Cycles) | 2.3 | 2.2 | 1.8 | 1.7 | 1.5 | 1.3 | 1.1 |

ᵃRecrystallized average spherulite diameter
ᵇRecrystallized maximum spherulite diameter Control Example 5

PFA pellets used in Example 7 and PTFE powder H used in Control Example 3 were melt mixed in a manner similar to that of Example 1 except for the levels of contents as given in Table 6. Table 6 shows the resultant compositions and properties of the test pieces molded from those compositions. Even when the content was increased to 10 wt %, the recrystallized average spherulite diameter was 21 μm and the recrystallized maximum spherulite diameter was 30 μm or greater.

TABLE 6

Results for Control Example 5

| PTFE H (wt %) | 0 | 2 | 5 | 10 |
|---|---|---|---|---|
| Composition: MFR (g/10 min) | 1.7 | 1.9 | 2.1 | 2.4 |
| Test Piece: RASDᵃ (μm) | 44 | 35 | 24 | 21 |
| Test Piece: RMSDᵇ (μm) | 63 | 50 | 30 | 30 |

ᵃRecystallized average spherulite diameter
ᵇRecrystallized maximum spherulite diameter Example 10

A coagulated powder was obtained by stirring an aqueous dispersion of a PFA (average particle size of about 0.2 μm, PPVE content of 3.1 wt %, melt temperature of 308° C.), adding nitric acid and then trichlorotrifluoroethane, and drying for 10 hours at 150° C. The resultant dried powder (995 parts by weight) and 5 parts by weight of PTFE powder B used in Example 1 were fed into a Henschel mixer (Mitsui Miikekakoki Company: FM10B Model) for mixing for 10 minutes at 3000 rpm, followed by adding, while decreasing the number of revolutions to 1000 rpm, 150 parts by weight of pure water and then 500 parts by weight of trichlorotrifluoroethane in small increments, followed by increasing the number of revolutions to 3000 rpm and stirring for one minute to obtain a granulated powder. This powder was then heat treated for 12 hours at 300° C. to obtain a powder composition having an average particle size of about 380 μm. The composition had an MFR of 0.6 g/10 minutes and a melt indexer extrudate having a recrystallized average spherulite diameter of 3 μm and a recrystallized maximum spherulite diameter of 5 μm. A PFA powder obtained by a similar operation using no addition of PTFE had an MFR of 0.6 g/10 minutes with a recrystallized average spherulite diameter of 55 μm and a recrystallized maximum spherulite a diameter for the extrudate of 70 μm.

Example 11

The powder composition obtained in Example 10 and a PFA powder were used to mold tubes having outside diameter of 12.2 mm and wall thickness of 1.0 mm under the following conditions:
 Extruder (Tanabe Plastics Kikai Company)
 Cylinder inside diameter: 30 mm (L/D 20)
 Die inside diameter: 25 mm
 Mandrel diameter: 17 mm
 Set Temperatures (°C.):
  Cylinder Rear Section: 300
  Cylinder Center 360
  Cylinder Front: 380
  Adapter 380
  Crosshead: 380
  Die: 400–430
 Screw Revolutions: 10 rpm
 Sizing Die inside diameter: 12.5 mm
 Take-Up Rate: 0.5 m/min A sample of about 5 mm square was cut out from the tube to measure the surface roughness of the tube inside by a stylus probe-type three-dimensional surface roughness measurement device (Tokyo Seimitsu Company SURFCOM 575A-3DF) to give the results shown in Table 7. A test piece cut out from a tube gave a melt index extrudate having the same measured recrystallized average spherulite diameter as that of the composition of Example 10. 0.5% by weight of PTFE. Table 7 clearly shows that the inside surface of a tube prepared from a composition containing 0.5% by weight of PTFE and having a recrystallized average spherulite diameter of 3 μm and a recrystallized maximum spherulite diameter of 5 μm had far superior surface smoothness compared to the inside of a tube molded from a PFA powder containing no PTFE and having a recrystallized average spherulite diameter of 55 μm and a recrystallized maximum spherulite diameter of 70 μm.

TABLE 7

Results for Example 11

| Amount of PTFE Added (wt %) | Recrystallized Spherulite Diameters | | Surface Roughness of the Inside of the Tubes | |
|---|---|---|---|---|
| | Average (μm) | Maximum (μm) | Centerline Average Roughness (Ra) (μm) | Maximum Height (Rt) (μm) |
| No Additive | 55 | 70 | 0.10 | 0.64 |
| 0.5 | 3 | 5 | 0.02 | 0.10 |

Example 12

A PFA powder having PPVE content of 3.0 wt %, MFR of 1.9 g/10 min, and average particle size of about 500 μm (995 parts by weight) and 5 parts by weight of PTFE powder D used in Example 3 were fed to the screw extruder and melt mixed and extruded at a resin temperature of 360° C., followed by cutting the extrudate to give a pelletized composition having an average particle size of about 3 mm. The composition had an MFR of 1.9 g/10 min, and the melt indexer extrudate had a recrystallized average spherulite diameter of 3 μm and a recrystallized maximum spherulite diameter of 4 μm. PFA pellets, prepared according to the same operation except for adding no PTFE, gave an MFR of 1.9 g/10 min and the melt index extrudate gave a recrystallized average spherulite diameter of 66 μm and a recrystallized maximum spherulite diameter of 90 μm. The composition and the PFA pellets were fed to a blow molding machine and extruded at a resin temperature of 390° C. to give 1 L volume bottles, having an outside diameter of 90 mm and a wall thickness of about 1 mm. About a 5 mm square sample was cut out from the bottle and the inside of the bottle was measured for its surface roughness with a scanning laser microscope (Laser Tech TCH K.K., Model ILM21) giving the results shown in Table 8. The melt index extrudates from the test pieces cut out from these bottles gave recrystallized average spherulite diameters and recrystallized maximum spherulite diameters which were measured to be same as those of the above compositions. Table 8 clearly shows that the inside of the bottle molded from the PFA composition containing 0.5% by weight of PTFE and having a recrystallized average spherulite diameter of 3 μm and recrystallized maximum spherulite diameter of 4 μm is far superior in surface smoothness to that of the inside of the bottle molded from PFA powder having no PTFE added and having a recrystallized average spherulite diameter of 66 μm and a recrystallized maximum spherulite diameter of 19 μm.

TABLE 8

Results for Example 12

| Amount of PTFE Added (wt %) | Recrystallized Spherulite Diameters | | Surface Roughness of the Inside of the Bottles | |
|---|---|---|---|---|
| | Average (μm) | Maximum (μm) | Centerline Average Roughness (ra) (μm) | Maximum Height (Rt) (μm) |
| No Additive | 66 | 90 | 0.60 | 8.96 |
| 0.5 | 3 | 4 | 0.09 | 1.15 |

What is claimed is:

1. An article melt-formed from crystalline tetrafluoroethylene/fluoroalkoxy trifluoroethylene copolymer which contains polytetrafluoroethylene having a crystallization temperature of at least 305° C. and heat of crystallization of at least 50 J/g, wherein the resultant composition has recrystallized average spherulite diameter of not more than 15 micrometers, said article being a bottle.

2. An article as set forth in claim 1 in which the amount of the polytetrafluoroethylene contained in the tetrafluoroethylene/fluoroalkoxy trifluoroethylene copolymer composition is not more than 50% by weight.

3. An article melt-formed from crystalline tetrafluoroethylene/fluoroalkoxy trifluoroethylene copolymer which contains polytetrafluoroethylene having a crystallization temperature of at least 305° C. and heat of crystallization of at least 50 J/g, wherein the resultant composition has recrystallized average spherulite diameter of not more than 15 micrometers, said article being a tube for the transport of liquid.

* * * * *